(12) United States Patent
Mazzitelli et al.

(10) Patent No.: US 7,870,188 B2
(45) Date of Patent: Jan. 11, 2011

(54) SYSTEMS AND METHODS FOR EXPOSING WEB SERVICES

(75) Inventors: John J. Mazzitelli, Sicklerville, NJ (US); Salvatore J. Campana, Jr., Sewell, NJ (US); Ian P. Springer, Delran, NJ (US); Elzbieta M. Dziembowski, Swarthmore, PA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1675 days.

(21) Appl. No.: 10/903,277

(22) Filed: Jul. 30, 2004

(65) Prior Publication Data
US 2006/0026552 A1 Feb. 2, 2006

(51) Int. Cl.
G06F 15/16 (2006.01)
G06F 15/173 (2006.01)
(52) U.S. Cl. ..................... 709/203; 709/223; 709/225
(58) Field of Classification Search ............. 709/202, 709/223, 203, 205; 717/100, 101
See application file for complete search history.

(56) References Cited

U.S. PATENT DOCUMENTS

| 6,415,288 | B1 * | 7/2002 | Gebauer | 707/10 |
|---|---|---|---|---|
| 2003/0005166 | A1 * | 1/2003 | Seidman | 709/310 |
| 2004/0019670 | A1 * | 1/2004 | Viswanath | 709/223 |
| 2004/0221017 | A1 * | 11/2004 | Yoon | 709/217 |
| 2005/0125555 | A1 * | 6/2005 | Patel | 709/238 |
| 2005/0216585 | A1 * | 9/2005 | Todorova et al. | 709/224 |
| 2005/0273668 | A1 * | 12/2005 | Manning | 714/39 |

OTHER PUBLICATIONS

Javax.Management Package Information, from Java.Sun.Com.*
Java Management Extensions Instrutmentation and Agent Specification V1.2, from Java.Sun.Com.*

* cited by examiner

Primary Examiner—Hassan Phillips
Assistant Examiner—Joseph Greene (57) ABSTRACT

Systems and methods are disclosed for managing information technology resources. Management capabilities available for a particular IT resource are defined via at least one management interface. The management interface includes port types that specify attributes and operations available in a Web service to manage the IT resource. The port types are mapped to descriptors in a ModelMBeanInfo interface than can be used with an MBean that corresponds to the Web service.

32 Claims, 5 Drawing Sheets

SYSTEMS AND METHODS FOR EXPOSING WEB SERVICES

BACKGROUND

Today, information technology (IT) resources are managed using a variety of incompatible and often proprietary interfaces and protocols. Requirements for management information regarding the resources need to be specifically programmed to address new resources and in many cases the specific programming is not updated as new versions of the IT resources become available.

The problem of managing disparate IT resources is becoming more acute as systems are increasingly developed using IT resources that are deployed in remote locations and accessed via information networks, such as the Internet. Generally, the resources to be managed are not readily identifiable when the resources are highly distributed and independent of one another. Further, it is difficult to obtain information regarding properties and attributes of the resources, and protocols for exchanging management information with the resources. A further difficulty lies in determining the relationships among the resources used in a system to pinpoint operational problems when one or more of the resources do not respond as expected.

The term Web services, also referred to herein as "services", describes an approach to distributed computing in which interactions are carried out through the exchange of eXtensible Markup Language (XML) messages. Web services can perform any task that can be described and contained within one or more modules of code. For example, functions such as language translation or currency conversion, performing calculations for medical claims processing, and handling certain aspects of travel planning can be implemented in a Web service. Essentially any transaction or bit of business logic can become a Web service if it can be accessed and used by another system over a network such as the Internet.

A Web service is a software system that can be identified by a Universal Resource Identifier (URI) whose public interfaces and bindings are typically defined and described in an XML document. The description can be discovered by other software systems. These systems may then interact with the Web service in a manner prescribed by its definition, using XML based messages conveyed by Internet protocols.

The Web services architecture is based upon the interactions between three primary roles: service provider, service registry, and service requestor. These roles interact using publish, find, bind, and other operations. The service provider is the business that provides access to the Web service and publishes the service description in a service registry. The service requestor finds the service description in a service registry and uses the information in the description to bind to a service.

Web services typically send XML messages formatted in accordance with the Simple Object Access Protocol (SOAP) specification. The SOAP specification is a universally agreed-upon protocol that uses XML and optionally HTTP together to invoke functions exposed in Web services.

The XML messages can be described using the Web Services Description Language (WSDL) specification, which, along with the Universal Description Discovery and Integration (UDDI) registry, provides a definition of the interface to a Web service and identifies service providers in a network. The WSDL specification is an XML-based language used to define Web services and describe how to access them. An application trying to use a particular Web Service uses WSDL to find the location of the Web service, the function calls available, and the format that the client processor must follow to access the Web service. Therefore, the client processor first obtains a copy of the WSDL file and then uses the information in this file to format a request, often using SOAP. The UDDI registry supports Web services by providing a place for a company to register its business and the Web services that it offers. Users that need a Web service can use this registry to find a business that provides the service.

SUMMARY

In some embodiments a system and method are disclosed for managing information technology resources. Management capabilities available for a particular IT resource are defined via at least one management interface. The management interface includes port types that specify attributes and operations available in a Web service to manage the IT resource. The port types are mapped to descriptors in a ModelMBeanInfo interface than can be used with an MBean that corresponds to the Web service.

Various other features and advantages of embodiments of the invention will be more fully understood upon consideration of the detailed description below, taken together with the accompanying figures.

BRIEF DESCRIPTION OF THE FIGURES

The accompanying drawings, which are incorporated in and form a part of this specification, illustrate embodiments of the invention and, together with the description, serve to explain its principles.

DETAILED DESCRIPTION OF THE FIGURES

What is desired are systems and methods that allow disparate information technology (IT) resources to be monitored and controlled by authorized remote clients. Embodiments of systems and methods disclosed herein alleviate the need for developers to write, transmit, interpret, correlate messages by hand, and then map the messages to and from various native programming language constructs used by the disparate underlying resources.

Figure 1:
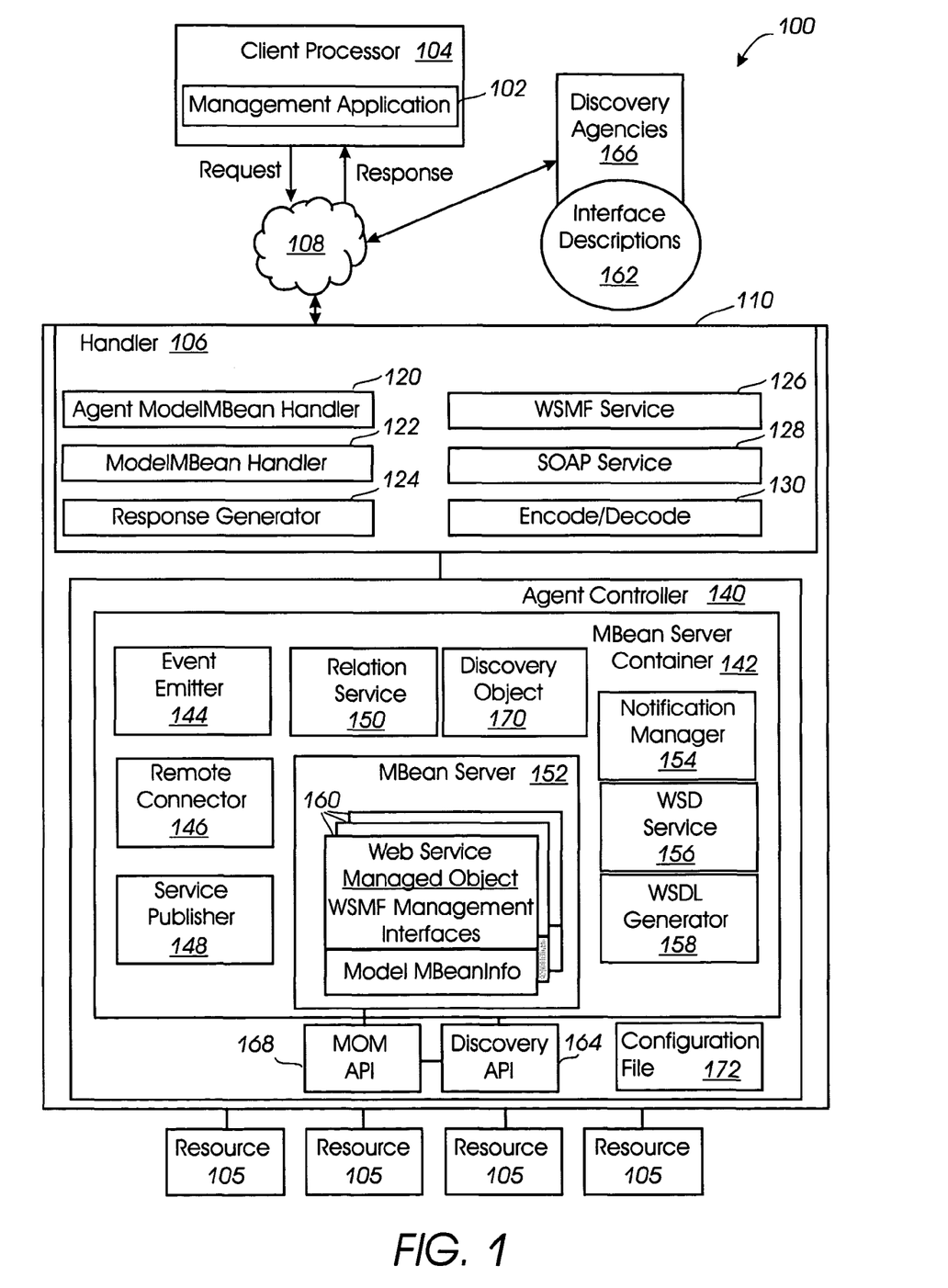
FIG. 1 is a diagram of components included in an embodiment of an information technology (IT) resource management system.

Referring to FIG. 1, an embodiment of a processing system 100 that allows a management application program 102 in client processor 104 to monitor and control information technology (IT) resources 105 is shown. Management application 102 can communicate with handler 106 via communication network 108. Handler 106 can be implemented to execute on a suitable processing platform 110, such as the Axis platform from the Apache Software Foundation in Forest Hill, Md., or the WEBLOGIC™ SOAP platform from BEA Systems, Inc. in San Francisco, Calif.

In some embodiments, requests and responses are communicated over network 108 via Simple Object Access Protocol (SOAP) messages. Handler 106 can provide a Java application program interface (API) for XML-based remote procedure calls (referred to as JAX-RPC). Other suitable application program interfaces, programming languages, remote procedure call facilities, and protocols can be utilized to enable communication between components in system 100 in addition to, or instead of, JAX-RPC and SOAP.

Handler 106 can include one or more components such as Agent ModelMBean handler 120, ModelMBean handler 122, response generator 124, Web Services Management Framework (WSMF) service 126, SOAP service 128, and encode/decode module 130. The components in handler 106 can interface with one another as well as with components of agent controller 140. Handler 106 and agent controller 140 form a liaison between management application 102 and the managed IT resources 105. In some embodiments, agent controller 140 can be implemented in a Java Virtual Machine (JVM) on a suitable data processing device.

In the embodiment shown, agent controller 140 includes one or more MBean server containers 142. MBean server containers 142 allow agent controller 140 to access different JMX implementations in different vendor environments using the same interface. In the embodiment shown, server container 142 can include an event emitter 144, remote connector 146, service publisher 148, relationship service 150, MBean server 152, notification manager 154, Web services directory (WSD) 156, and Web Services Description Language (WSDL) document generator 158. MBean server 152 can include one or more managed objects 160 that represent managed IT resources 105. In some embodiments, the managed objects 160 can be implemented as ModelMBeans. Managed objects 160 can represent any type of software, hardware, and/or firmware device.

Agent controller 140 can be configured as a Java Management Extension (JMX) agent, as described in the JAVA™ Management Extensions Instrumentation and Agent Specification, (Version 1.2, October 2002) by Sun Microsystems, Inc. in Santa Clara, Calif., (hereafter the "JMX Specification"). When implemented as ModelMBeans, managed objects 160 include a class with associated metadata called a ModelMBeanInfo interface. ModelMBeanInfo interfaces can be represented by the Java class javax.management.modelmbean.ModelMBeanInfo interface, as also described in the JMX Specification. Other suitable languages and formats for the ModelMBeanInfo interface can be utilized.

Managed objects 160 can be configured with one or more management interfaces. In some embodiments, the management interfaces comply with the Web Services Management Framework (WSMF) described in U.S. patent application Ser. No. 10/438,716 entitled "System and Method for Managing Web Services," filed on May 14, 2003 and assigned to Hewlett-Packard Development Company, L.P. In further embodiments, the management interfaces comply with the Unicenter Web Services Distributed Management (WSDM) interfaces as provided by Computer Associates International, Inc. in Islandia, N.Y. WSMF and WSDM are higher order specifications that are based on the WSDL specification. Other suitable languages and formats for the management interfaces can be utilized. Management interfaces can be implemented within managed objects 160 or in a layer external to managed object 160. Additionally, managed objects 160 can be implemented internally or externally to the resources 105 they represent.

In some embodiments, a WSMF management interface can include the following components:

a namespace that represents the scope of the definitions in the interface;

attributes that represent information about managed object 160 as a set of properties;

operations that can be provided to support the management of managed object 160; and notification types, which are the set of exceptions and state changes that can be reported by managed object 160.

An abstract base interface (ManagedObjectIdentity) can be used that is extended by all management interfaces. Managed object 160 does not typically implement the ManagedObjectIdentity interface directly since the identity interface does not represent a tangible resource.

In some embodiments, management interfaces are exposed as management Web services to management applications 102 through definition documents in WSDL format. WSDL generator 158 can translate information in the ModelMBeanInfo interfaces and/or WSMF management interfaces in managed objects 160 to WSDL documents. Interface descriptions 162 provide a common framework for exposing management features for managed objects 160 regardless of the resources 105 they represent. The WSDL documents can be published in interface descriptions 162 by service publisher 148 via discovery application program interface (API) 164. The management application 102 can use information in interface descriptions 162 to determine operations, management attributes, event types, and other features available in managed objects 160.

Management application 102 can also monitor, audit, and control various aspects of resources 105 represented by managed objects 160, as well as register to receive event notifications from managed objects 160. WSDL generator 158 can generate interface descriptions 162 in any suitable format, in addition to or instead of WSDL documents. Additionally, management applications 102 can discover interface descriptions 162 via any suitable discovery agency 166, such as the Universal Description Discovery and Integration (UDDI) registry.

Managed objects 160 can interface with the underlying resources 105 to gather information to populate data fields in the management interfaces. Further, managed objects 160 can receive information and control parameters from the management application 102 via the management interfaces. In some implementations, the management interfaces can be configured to hide selected management features from the management application 102 that are not authorized to access the selected management capabilities. Each managed object 160 can also utilize one or more additional extended interfaces that expose relevant information to the management application 102. The extended interfaces can be implemented as needed based on the type of resource to be managed.

In some embodiments, interface descriptions 162 define schemas for messages and corresponding WSDL parts including port types; marker attributes; and namespaces. Port types describe a list of potential management capabilities that can be accessed by management application 102 or other authorized component. Ports can implement some or all of the port types defined in interface descriptions 162, thus providing a mechanism that allows managed objects 160 to selectively expose available management capabilities and provide management application 102 with instructions for using the exposed management capabilities. The operations corresponding to port types that are not implemented by a particular port will be hidden from management application 102.

Managed objects 160 can be utilized as Web services by management application 102. Web services can be document-oriented endpoints or method-oriented endpoints. The term endpoints refers to the host processor's address numbers on which the server can receive incoming calls. The messages exchanged with a document-oriented Web service can include an XML document. An example of document-oriented Web services is discovery agencies 166, which provide interface descriptions 162 to authorized requesters, such as management application 102. With method-oriented Web services, such as managed objects 160, handler 106 can be configured to transmit and receive messages corresponding to a RPC. Request message(s) can be sent from management application 102 to handler 106, and can include an operation or attribute identifier and input parameters. Handler 106 can use the information in the message to map to a method, such as a "get attribute", "set attribute", or "invoke" to call an operation in the appropriate native programming language for the underlying resource. After the request is fulfilled, a response message can be sent from managed object(s) 160 via handler 106 to management application 102. The response message can include any suitable information such as the method identifier, the result of executing the method, and any output parameters (or exception information in the case of an error).

Agent controller 140 can initialize MBean server containers 142. MBean server container 142 is a wrapper for MBean server 152 that provides access to MBean server 152 and other components of agent controller 140. Managed Object Manager (MOM) API 168 can be used to add, update, and remove managed objects 160 from MBean server 152. MBean server container 142 can be implemented to support local and/or remote MBean servers 152. Agent controller 140 can be implemented to execute within another process in the same JVM, or independently in a separate instance of a JVM.

Event emitter 144 can be configured to include a thread pool that executes event emitter objects. The event emitter 144 can send notice of events from managed objects 160 to all management applications 102 that have subscribed to receive notices of the event.

The managed objects 160 may be running in the same JVM as agent controller 140, in another process, or on a different computer entirely. Remote connector 146 allows handler 106 to connect to an MBeanServerContainer 142 that is outside of agent controller 140. In some embodiments, MBean server container 142 can expose itself to remote management applications 102 via the Remote Method Invocation (RMI) technology developed by Sun Microsystems, Inc. and IBM, Inc. of Armonk, N.Y., as specified, for example, in the "Java Language Mapping to OMG IDL Specification", June 1999.

Service publisher 148 can publish managed objects 160 to discovery agencies 166. Once managed objects 160 are published, the associated WSDL documents have their own identifier, such as a Universal Resource Locator (URL) that allows management applications 102 to find the interface descriptions 162 via discovery agencies 166. When managed objects 160 are removed from MBean server container 142, service publisher 148 can uninstall (i.e., undeploy) the Web service associated with the removed managed object 160.

The management interfaces in managed object 160 can include features such as an attribute that returns a list of the relations supported by managed object 160, a list of relationships that are currently active for managed object 160, and a list of identifiers such as URLs of relationships having a specific relation with another managed object 160. Relationship service 150 manages these relationships between managed objects 160. In some embodiments, the relationship attributes can indicate whether managed object 160 is contained in, is dependendent on, depends on, contains, corresponds to, and/or is a collection manager for other managed objects 160.

Notification manager 154 can issue, store, retrieve, and in some implementations, recover notifications. Notification manager 154 can also utilize a subscription manager (not shown) that provides a mechanism for creating and destroying subscription tables for managed objects 160 in system 100. In some embodiments, a persistence mechanism can be used by the notification manager 154 that indicates how long an event will be retained before it is allowed to be pushed out of a queue by other more recent events.

WSD service 156 maintains a table of all deployed Web services and their endpoint information, which in some embodiments includes the endpoint URL and WSDL URL.

WSDL generator 158 creates WSDL documents for WSMF management interfaces. The WSDL documents can be published in interface descriptions 162.

Discovery API 164 allows components in agent controller 140 to add and remove managed objects 160 representing disparate IT resources 105 from independent software vendors (ISVs) in MBean server 152. One or more discovery objects 170 can be included with agent controller 140 to provide strategies that allow local and remote managed objects 160 to be discovered automatically. Alternatively, integration vendors may implement their own discovery strategies utilizing the discovery API 164. In addition, discovery API 164 can be used in conjunction with MOM API 168 to facilitate adding, updating, and removing managed objects 160.

Figure 2:
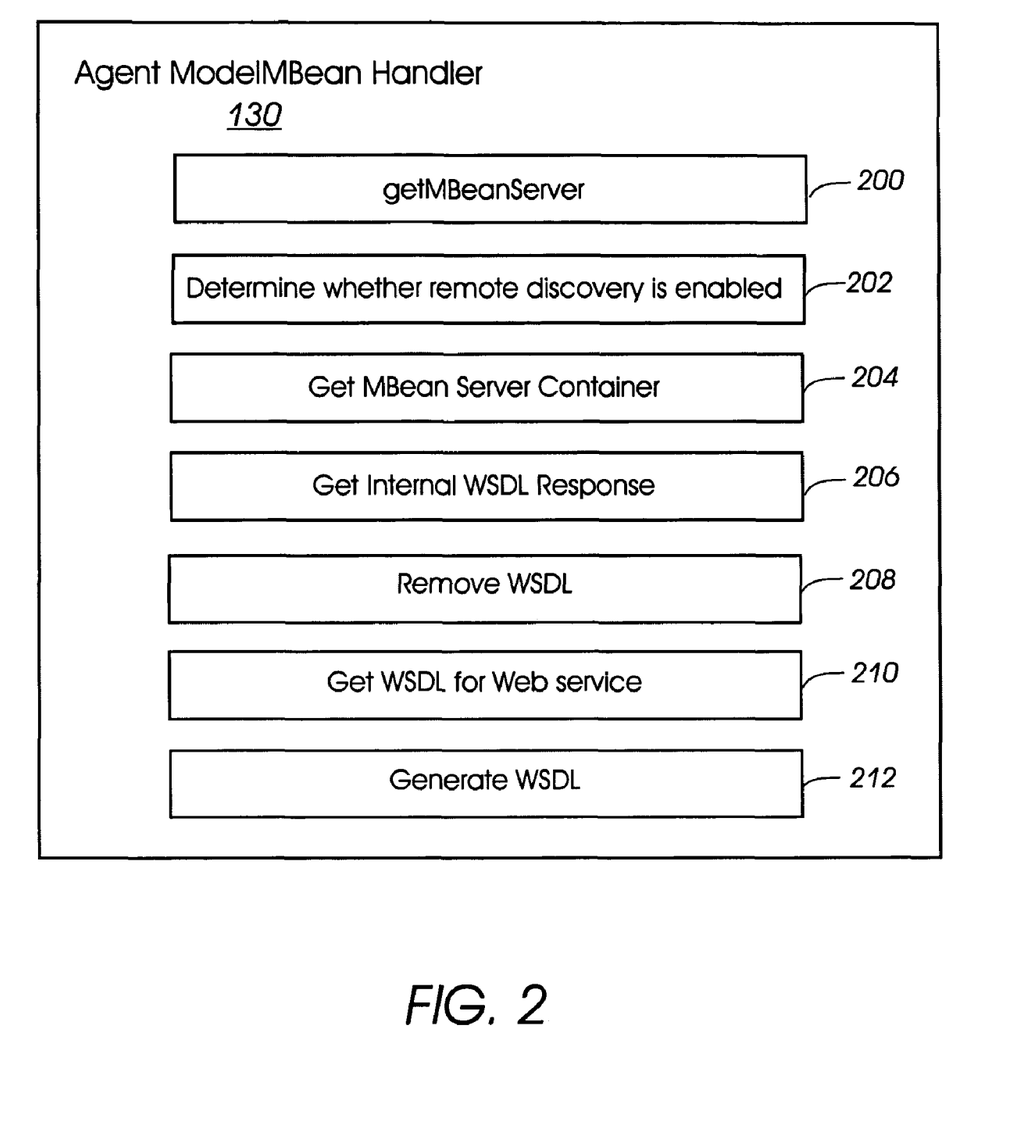
FIG. 2 is a diagram showing an embodiment of processes that can be included in the agent ModelMBean handler of FIG. 1.

Referring to FIGS. 1 and 2, FIG. 2 shows a diagram of an embodiment of processes that can be included in Agent ModelMBean handler 120. Process 200 includes getting identifying information for the MbeanServer 152, such as a URL. In some embodiments, agent controller 140 is implemented as a managed object 160 with WSMF management interfaces that include the identifying information published in interface descriptions 162, which can be exposed and discovered by Agent ModelMBean handler 120. Process 202 includes determining whether Mbean server container 142 is remote to the managed objects 160 and configured with RMI capabilities. Process 204 includes determining the identifying information for Mbean server container 142. The identifying information can be discovered by Agent ModelMBean handler 120 when agent controller 140 is implemented as a managed object 160 with WSMF management interfaces that are published in interface descriptions 162. Other suitable processes for discovering identifying information for Mbean server 152 and Mbean server container 142 can be utilized in addition to, or instead of, interface descriptions 162.

Process 206 includes getting a response message for managed object 160 representing agent controller 140 when a WSDL file based on the interfaces that managed object 160 implements is successfully generated. The base WSDL documents and their schemas can be included in the directory represented by WSD service 156.

In some embodiments, WSDL documents are generated the first time a given service is requested. Generated WSDL documents can be stored in a memory cache for quick access, and removed from the cache when managed object 160 is removed, as indicated by process 208. The WSDL documents can also be cached in memory with a file system backup. The cache and file systems can be searched as indicated by process 210 before a new WSDL document is generated for managed object 160 in process 212.

Figure 3:
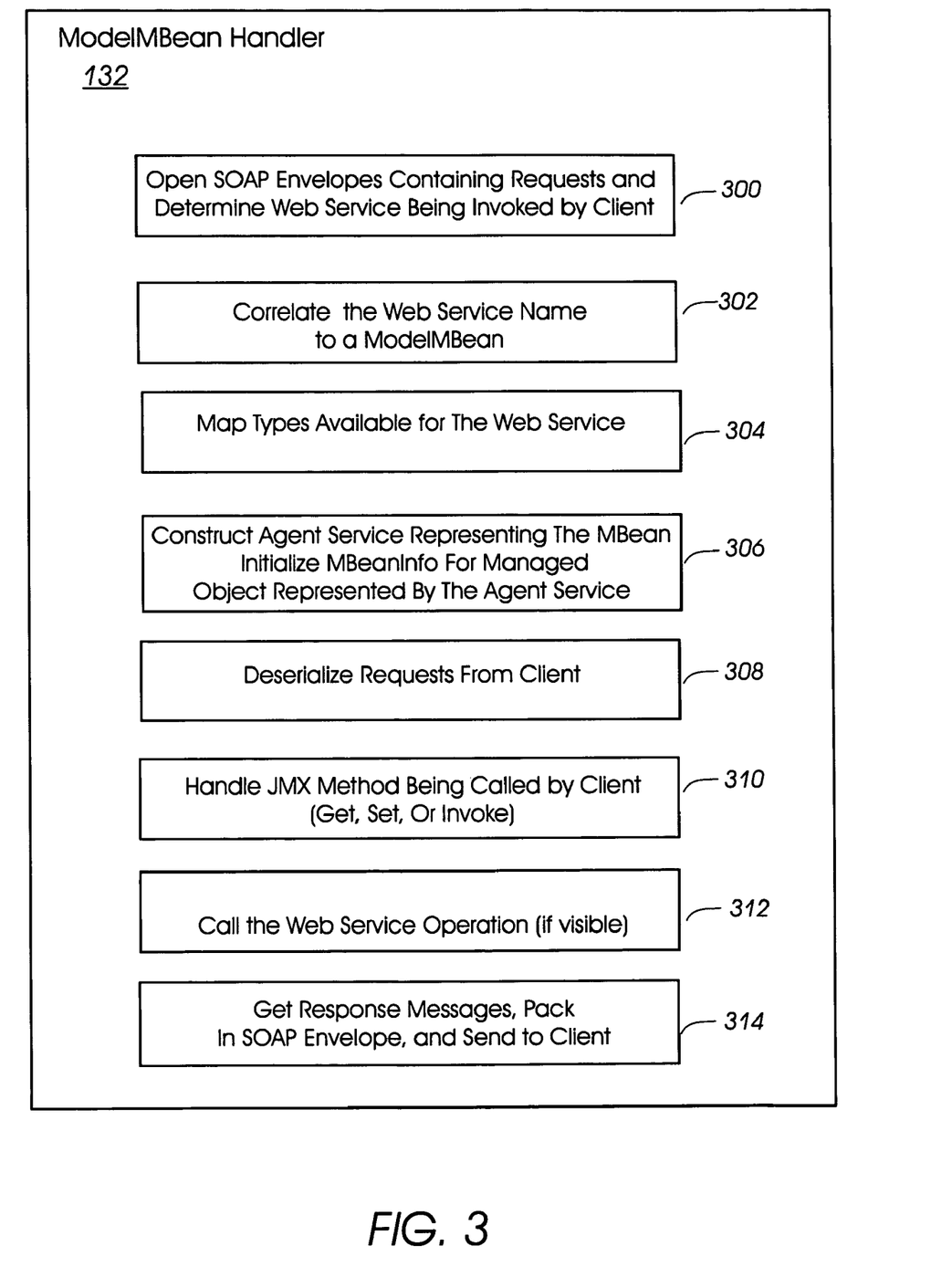
FIG. 3 is a diagram showing an embodiment of processes that can be included in the ModelMBean handler of FIG. 1.

Referring to FIGS. 1 and 3, FIG. 3 shows a diagram of an embodiment of processes that can be included in ModelMBean handler 122. In some embodiments, ModelMBean handler 122 provides a JAX-RPC handler that maps Web services represented by managed objects 160 to JMX ModelMBeans.

In the embodiment shown, process 300 includes unpacking the SOAP messages containing the requests from client processor 104, and determining the Web service being invoked by the management application 102. For example, a WSDL document containing the name of the service being invoked can be discovered by the management application 102 through discovery agencies 166. The ModelMBeanInfo can be derived from the management interfaces in managed objects 160, or from the corresponding interface description 162. Accordingly, handler 106 can use the ModelMBeanInfo to correlate the service names specified in the SOAP request message from management application 102 to ModelMBeans in MBean server 152, as indicated by process 302.

The metadata in the ModelMBeanInfo interface describes the visible operations and attributes supported by managed object 160. The metadata also includes descriptors, which are name-value pairs that can be used to provide information about the features of the corresponding managed object 160, such as port types and namespaces for operations. An example of the structure for a ModelMBeanInfo interface that can be utilized for a ModelMBean corresponding to managed object 160 is shown in Table 1:

TABLE 1

| ModelMBeanInfo | |
|---|---|
| Name | Displayable name |
| Persist Policy | Determines when MBean is placed in persistent storage (e.g., Never, OnTimer, OnUpdate, NoMoreOftenThan) |
| Persist Location | Location to store value of Persistence Policy |
| Persist Name | Name of Persist Policy |
| Persist Type | Type of persister used to persist the data (e.g., FileSystem, XML, Format) |
| Currency Time Limit | Indicates period of time value is considered current (e.g., always stale, never stale, time limit) |
| Log | Indicates whether Logging is enabled |
| Log File | Where to log the notification |
| Export | Value used to locate MBean |
| webservice | Indicates whether MBean should be published as a Web service |
| webservicename | Name of MBean Web Service |
| WSMF | Indicates whether MBean is WSMF compliant |
| WS Resource Properties | Map of port type names to Web Service Resource Properties |
| Target namespace | WSDL target namespace |
| Visibility | Indicates level of visibility of MBean (e.g., Wide, Narrow, Show, Hidden) |
| TargetObject | Object to be used at the target for the operation call |
| TargetType | Target object type (e.g., Java object, set of Java objects, MBean, MBean query set, Multiple distinct targets, Self (ModelMBean itself), access via a Handle, access via IOR, access via EJB Handle, access via RMI Reference) |
| Resource Properties | Map of port type names to Web Service resource properties schema |
| presentationString | XML-encoded string which describes how the feature should be presented |
| OperationInfo | |
| Returns | void |
| Signature | return parameter(s) |
| Descriptor | |
| Persist Policy | Determines when an operation is placed in persistent storage (e.g., Never, OnTimer, OnUpdate, NoMoreOftenThan) |
| Persist Location | Location to store value of Persistence Policy |
| Persist Name | Name of Persist Policy |
| Persist Type | Type of persister used to persist the data (e.g., FileSystem, XML, Format) |
| Currency Time Limit | Indicates period of time value is considered current (e.g., always stale, never stale, time limit) |
| Target namespace | WSDL target namespace |

TABLE 1-continued

| ModelMBeanInfo | |
|---|---|
| Name | Displayable name |
| Visibility | Indicates level of visibility of operation (e.g., Wide, Narrow, Show, Hidden) |
| Role | Role played by operation (e.g. getter, setter, constructor, operation) |
| Object Reference Set | Indicates whether target object is a collection of Java objects |
| Category | Management Interface Categories (e.g., ConfigurationPort, ControlPort, MonitoringPort) |
| TargetObject | Object to be used at the target for the operation call |
| TargetType | Target object type (e.g. Java object, set of Java objects, MBean, MBean query set, Multiple distinct targets, Self (ModelMBean itself), access via a Handle, access via IOR, access via EJB Handle, access via RMI Reference) |
| TargetOperation | Will contain the signature and return type of the operation on the target object. Allows ModelMBean to represent the actual operation under a different name with a different signature. |
| aggregateMethod | Type of aggregation to use when a target type includes a set of targets (e.g., Null, Concatenate results, Minimum value of all results, Maximum value of all results, Average value of all results, Sum all results, Boolean AND, Boolean OR) |
| LastReturnedValue | Last Returned Value of all results |
| LastReturnedTimeStamp | timestamp for value last returned |
| InputWSDLMessage | A QName that refers to this operation's input to an existing WSDL message to allow more flexible auto-generation of WSDL documents |
| OutputWSDLMessage | A QName that refers to this operation's output to an existing WSDL message to allow more flexible auto-generation of WSDL documents |
| AttributeInfo | |
| Type | |
| Access Descriptor | Read/Write |
| Visibility | Indicates level of visibility of attribute (e.g., Wide, Narrow, Show, Hidden) |
| PersistPolicy | Determines when an attribute is placed in persistent storage (e.g., Never, OnTimer, OnUpdate, NoMoreOftenThan) |
| Persist Location | Location to store value of Persistence Policy |
| Persist Name | Name of Persist Policy |
| Persist Type | Type of persister used to persist the data (e.g., FileSystem, XML, Format) |
| Target namespace | WSDL target namespace |
| Current Value | current value of the attribute |
| Timestamp | indicates last time the attribute value was updated |
| Iterable | Indicates whether the attribute is enumerable |
| presentationString | XML-encoded string which describes how the feature should be presented |
| getMethod | operation name used to retrieve attribute value |
| setMethod | operation name used to store attribute value |
| Protocol Map | holds a set of protocol name/value pairs |
| Category | Management Interface Categories (e.g., ConfigurationPort, ControlPort, MonitoringPort) |
| Notification Descriptor | |
| Log | Logging enabled? |
| presentationString | XML-encoded string which describes how the feature should be presented |
| Log File | Where to log the notification |
| Currency Time Limit | Indicates period of time value is considered current (e.g., always stale, never stale, time limit) |
| Severity | Indicates severity level of notification (e.g., unknown, non-recoverable, critical, major, minor, warning, informational) |
| MessageID | Used to retrieve text to match the ID to minimize notification message size |

For example, descriptor fields called "webservice" and "webservicename" can be implemented in the ModelMBean- Info interface to allow service publisher 148 to determine whether the ModelMBean corresponding to managed object 160 should be published, and the name of the Web service's target namespace for its interface description 162. Descriptors associated with the operations can provide information regarding the category or port type to which the operation belongs. The descriptors can also include a target namespace that specifies the namespace where the elements that define the operation are placed.

In some embodiments, a JMX MBean is WSMF-compliant if:

It is a ModelMBean.

The MBean Descriptor has a field named wsmf whose value is true.

The MBean Descriptor has a field named webService whose value is true (this publishes its Web service). If the value is false, the Web service is not published.

The MBean Descriptor has a field named targetNamespace that defines its WSMF WSDL's default target namespace. If a targetNamespace is not specified, a default name is assigned to it.

Optional settings can include:

The MBean Descriptor has a field named webServiceName that defines its published Web service's name.

Each Operation or Attribute Descriptor has a field named targetNamespace that defines the target namespace within the WSMF WSDL to which the operation/attribute belongs.

Each Operation or Attribute Descriptor has a field named category that defines the WSMF WSDL portType to which the operation/attribute belongs.

The MBean Descriptor has a field named category that defines the default WSMF WSDL portType that should be assigned to operations/attributes if a category is not specifically defined for an operation.

Process 304 includes mapping the port types available for the Web service and providing the port type name for the specified operation. Information regarding the port types is available in the management interfaces, which is translated to a ModelMBeanInfo interface as shown in Table 1, as well as a WSDL document that can be published to interface descriptions 162. Process 306 includes constructing a service (not shown) for the corresponding ModelMBean. The service initializes the ModelMBeanInfo interface based on the information in the management interfaces for the corresponding managed object 160.

Process 308 includes deserializing request messages from management application 102. The deserializing process determines the parameters and arguments that are supplied when an operation in managed object 160 is invoked, or an attribute is set.

Process 310 handles the method being called by the management application 102. In some embodiments, the methods include getattribute, setAttribute, and Invoke methods. The getattribute method returns the value of the specified attribute name. The setattribute method writes values to the specified attribute. The Invoke method allows management application 102 to call any of the operations exposed by the managed object 160. Management application 102 can provide the name of the intended operation, the objects to be passed as parameters, and the types for the parameters. If the requested operation is successfully mapped to its internal implementation in managed object 160, the Invoke method returns the result of the operation.

Process 312 determines whether the operation in managed object 160 being invoked is visible to the invoker, and allows calls to only visible operations. In some embodiments, the Visibility parameter in the ModelMBeanInfo interface can be used to determine whether the operation is visible. The value of the Visibility parameter can vary from completely hidden, to partially visible, to fully visible, depending on the access rights of the management operation 102. In addition, port types in the management interfaces can describe a list of potential management capabilities for managed object 160. By making ports available that implement some or all of the port types defined in corresponding interface descriptions 162, managed objects 160 can expose their management capabilities and provide instructions to use the management capabilities. Managed object 160 is not required to expose the same management interfaces to all callers. It is anticipated that many managed objects 160 will expose different features in management interfaces 108 to different requesters, such as:

limiting anonymous management applications 102 to only query basic information;

allowing recognized management applications 102 to also query performance information; and allowing trusted management applications 102 access to all features in management interfaces.

In some embodiments, a marker attribute can be added to the port types to indicate to client processor 103 that the port types are management port types.

Process 312 includes calling the operation in the Web service requested by management application 102. If the service being invoked is being called for the first time, process 312 can include generating the WSDL document before invoking the operation.

Process 314 can include getting the response message from the Web service operation, packing the message in a SOAP envelope, and sending the SOAP envelope to management application 102 that initiated the request.

In some embodiments, response generator 124 builds the response message for a request based on the WSDL document. Response generator 124 can query the WSDL document for the method name and generates an XML document containing the response. If the return object is an Array type, this class can be used to generate the XML for the representation of the array based on the WSDL.

In some embodiments, handler 106 can include a constructor that creates WSMF service 126 and performs functions that allow management application 102 to access Web services represented by managed objects 160. In some embodiments, WSMF service 126 is implementation as a JAX-RPC handler as defined by the JAX-RPC specification. Each WSMF Web service can be configured to pass through a JAX-RPC handler that acts as a proxy to local or remote MBean servers 152. Functions that can be performed by WSMF service 126 include getting and/or setting the names of MBean server container 142 and the MBean corresponding to a specified managed object 160. WSMF service 126 can also include functions that get and set the endpoint URL, map types, get methods, get information from MBeanInfo interface, and get descriptor values for WSMF service 126. WSMF service 126 can further import attributes and operations from the specified MBeanInfo; and determine whether an operation or attribute is hidden. Other suitable functions can be performed by WSMF service 126 in addition to, or instead of, the foregoing functions.

Figure 4:
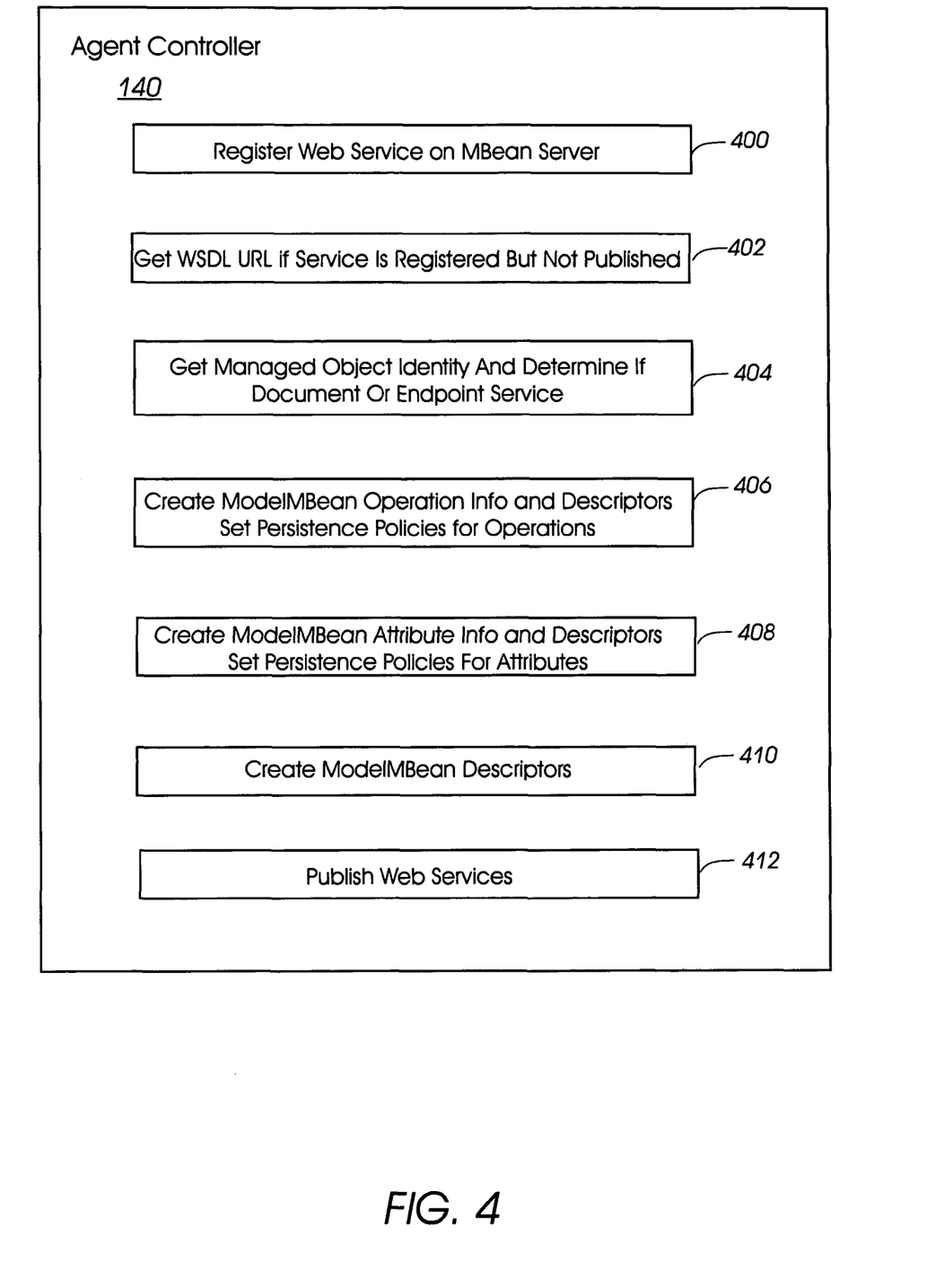
FIG. 4 is a diagram showing an embodiment of processes that can be included in the agent controller of FIG. 1.

Referring to FIG. 4, a diagram of some of the processes that can be included in an embodiment of agent controller 140 is shown. Process 400 can register the Web service MBean associated with managed object 160 in MBean server 152 if the Web Service MBean is not already registered. If the MBean is registered but the corresponding WSDL document for the WSMF management interfaces has not been published, then process 402 can invoke a method to get the URL of the WSDL document describing the Web service. Once the WSDL URL is determined, process 404 determines the identity of the managed object 160, as well as whether the corresponding Web service is a document or endpoint service. Processes 406 and 408 include creating a ModelMBeanInfo interface for operations and attributes associated with managed object 160, and setting persistence policies for the operations and attributes, as shown for example in Table 1. Process 410 includes creating ModelMBeanInfo interface descriptors, as also shown for example in Table 1, that provide information regarding the ModelMBean associated with managed object 160. Process 412 can include publishing the WSMF document for the Web service to expose the Web service to management applications 102.

In some embodiments, one ore more configuration files 172 can be used to deploy managed objects 160. These configuration files 172 can include, for example, information for configuring various components such as, for example, agent controller 140, MBean server 152, Web services publisher 148, WSDL generator 158, and discovery object 170. Configuration file 172 can define MBean servers 152 that are to be accessed by agent controller 140; discovery objects 170 and strategies that are to be run; and how agent controller 140 is to publish managed objects 160 represented by Web services. In addition, type mappings between Java data types and SOAP/XML types, and startup and shutdown options to be used when the agent controller 140 is starting up or shutting down can be included in configuration file 172. For each MBeanServer configuration, the agent controller 140 can create an MBean Server container 142 that will be used to access the MBean server 152. Tables 2-5 show examples of sections that can be included in a configuration file 172 for configuring MBean server 152, discovery object 170, service publisher 148, and WSDL generator 158.

An MBeanServers section of configuration file 172 can define the set of MBean Servers 152 that host MBeans corresponding to managed objects 160, such as follows in Table 2:

TABLE 2

MbeanServer Configuration File Elements and Definitions

| Elements | Definition |
| --- | --- |
| MBeanServer | Describes the configuration of a specific MBeanServer 152. |
| MBeanServerType | Selects an MBean server type such as a standard JMX API, Apache Tomcat, BEA WebLogic Server, RemoteMx4j, Custom (requires a customized API). |
| SbaJmxServices | Agent controller 140 can manage internal JMX services within the MBeanServer 152 to support WSMF managed objects 160. Some of the internal services can automatically be registered on the MBeanServer if publisher-enabled. This optional element can be used to define which services are to be registered even if the service is not publisher-enabled. |
| WebServiceDirectory | Specifies identifying information for WSD Service 156. |
| NotificationManager | Specifies identifying information for NotificationManager 154, which handles notifications and subscriptions for WSMF MBeans registered in the same MBeanServer 152. |

TABLE 2-continued

MbeanServer Configuration File Elements and Definitions

| Elements | Definition |
| --- | --- |
| Persistence | Configures the persistence settings for the Notification Manager 154. |
| PersistPolicy | Policy that determines when managed object 160 is to be persisted. For example, values can be Never, OnUpdate, OnTimer, and NoMoreOftenThan. |
| PersistPeriod | A period of time, in seconds. |
| PersistLocation | The location to store the persistent data. |
| PersistName | Managed object 160 is persisted under this name. |
| PersistType | This field identifies the type of Persister that should be used to persist managed object 160. |
| EmitterThreadPool | Configures the thread pool used to emit notifications to subscribers. |
| InitialSize | Sets the initial number of threads to be created when the thread pool is initialized. |
| MaximumSize | Sets the maximum number of threads that the thread pool can have. |
| RelationshipService | This service provides the necessary infrastructure that allows WSMF managed objects 160 to maintain a list of their relationships. |
| ObserverService | This service monitors a set of WSMF managed objects 160 for any notifications or change of attributes and performs customized actions based on a configured set of policies. |
| PolicyManager | Defines the policy manager that will be invoked when an observed managed object 160 emits a notification. |
| JmxListeners | Lists all listeners that will be created to observe notifications emitted from MBeans. |
| ObjectName | The name of the observed MBean. |
| Jmxqueryexp: QueryExp | Describes a JMX Query expression. |
| NotificationType | A list of notifications to be listened for. |
| WsmfListeners | Lists all listeners that will be created to observe notifications emitted from managed objects 160. |
| EndpointUrl | The service endpoint URL of managed object 160 to be observed. This is the URL where the subscription requests will be sent. |
| EventType | A list of event types to be subscribed to. |
| HttpBasic-Authentication | Provides the credentials to be used for HTTP Basic Authentication when agent controller 140 acts as a client. |
| realm | Specifies the realm portion of the HTTP Basic Authentication credentials. |
| username | Specifies the username portion of the HTTP Basic Authentication credentials. |
| password | Specifies the password portion of the HTTP Basic Authentication credentials. |
| CollectionsService | Specifies service that supports features in management interfaces that aggregate responses from multiple managed objects 160. |
| IsPublisherEnabled | If true, MBeans that are registered in this MBeanServer 152 will be published as Web services. |
| IsPublishSbaJmx-Services Enabled | If true, the internal services in agent controller 140 will be published as Web services. |

Figure 5:
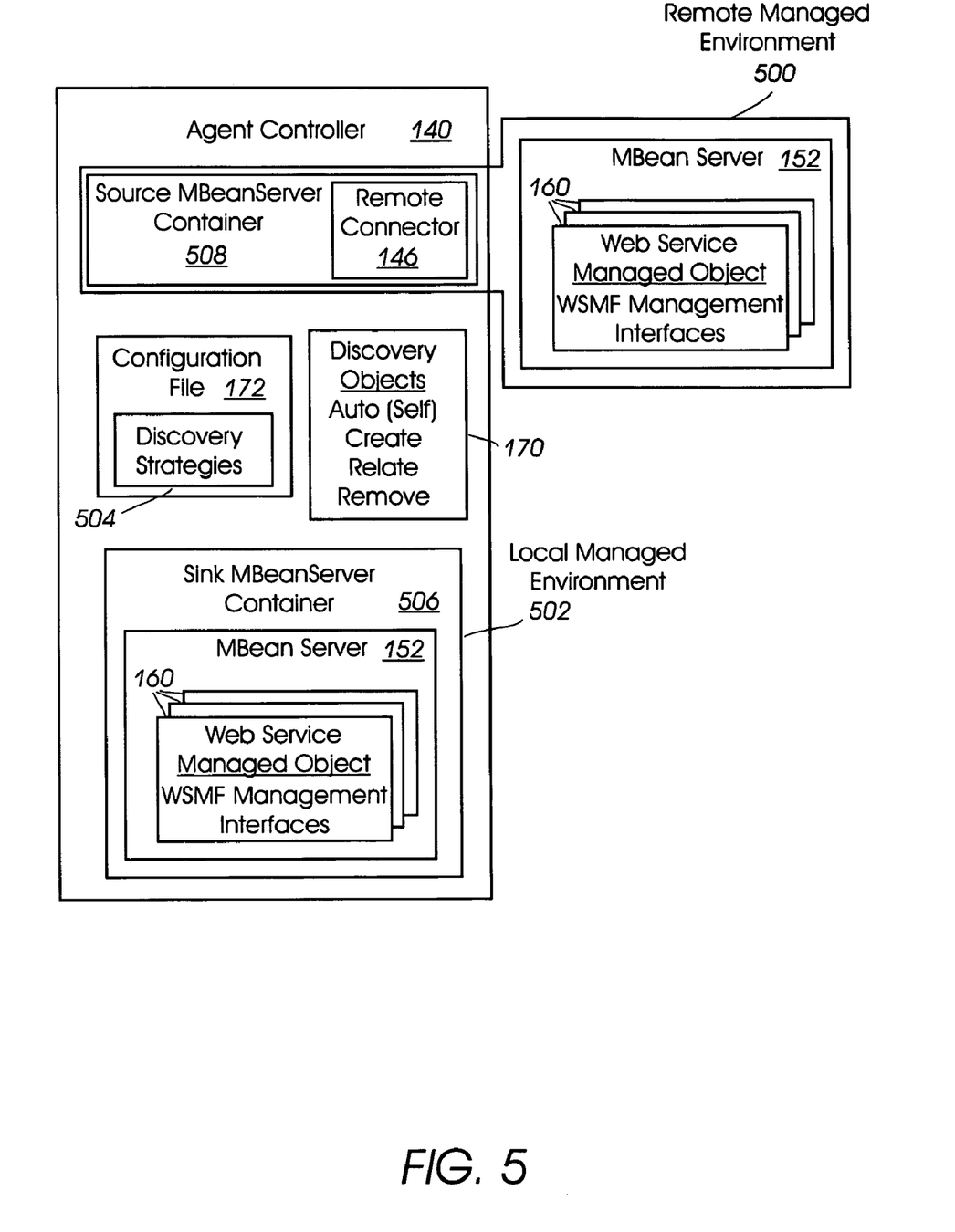
FIG. 5 is a diagram showing remote managed objects discovered by the agent controller of FIG. 1.

Referring to FIG. 5, a DiscoveryObject configuration section, as shown for example in Table 3, of configuration file 172 can specify a list of discovery objects 170. Discovery objects 170 may have access to more than one MBeanServer 152 and can utilize different strategies to examine remote managed environments 500 and local managed environments 502.

TABLE 3

Discovery Object Configuration Elements and Definitions

| Elements | Definition |
| --- | --- |
| DiscoveryObject | Describes the configuration and discovery strategies of each discovery object 170 including the strategy used to access the remote managed environment. An AutoDiscoveryStrategy can be included with Agent controller 140. |
| Strategy | The class name of the discovery strategy that can be used to examine the remote managed environment and populate the MBeanServer with the appropriate MBeans. |
| Config | Optional XML configuration data file for discovery strategy. |
| Properties | Optional set of generic name/value pairs that can be used to configure discovery strategy 504. The names and values of these properties can be defined by each individual strategy and differ from strategy to strategy. |
| PollFrequency | Optional setting that can be used by polling strategies to customize the length of time to elapse (in milliseconds) between each poll of the remote managed environment. |
| MBeanServerNames | Lists the names of all the MBeanServer that this discovery object 170 can access. The MBeanServer names can be defined in the name attribute of the MBeanServer configuration file elements. An optional isSinktrue attribute can be set to indicate to a discovery object 170 that MBeans should be registered to a particular MBeanServer. |
| WaitForDiscoveryObjects | Lists names of discovery objects 170 that this discovery object 170 will wait for before starting. When all the discovery objects 170 have completed their initial discovery, this discovery object 170 will begin its initial discovery. |
| IsExternalDiscoveryEnabled | When true, indicates that some external entity will be populating the MBeanServer 152 instance and that a discovery object 170 needs to run to monitor that process. |
| Remote | Specifies that a MBeanServerContainer 142 wrapping this MBeanServer 152 can be accessed remotely. |

To enable managed objects 160 in agent controller 140, configuration file 170 can include one or more discovery strategies 504. During startup, a managed object 160 for agent controller 140 can be created and registered in MBean Server 152 associated with sink MBeanServer container 506. An MBeanServer container can be configured as a sinkMBean server container 506 when the isSink attribute in the MBeanServerNames parameter (Table 3) is set to true. When the isSink parameter is set to false, a source MBeanServer container 508 can be created.

If one or more MBeanServer containers 506, 508 are created, their relationship to agent controller 140 can be established. For example, MBeanServer containers 506, 508 have a "contained-in" relationship with agent controller 140. The inverse relationship also exists, that is, a "contains" relationship from the agent controller 140 to the MBeanServer containers 506, 508. Additionally, MBeanServer container 506, 508 can have a "contains" relationship to each of its published managed objects 160.

In some embodiments, discovery objects 170 include a "create-strategy" discovery object 170 that examines configuration file 172 and based on a specified value set in configuration file 172, creates and registers managed objects 160 in MBean server 152 associated with a specified "sink" MBeanServer container 506. A "relate-strategy" discovery object 170 can examine specified source MBeanServers 152 and add relationships to specified managed objects 160. A "remove-strategy" discovery object 170 can periodically poll specified remote managed environments 500. The discovery object's strategy can poll for the existence of the same file used by the "create-strategy" discovery object 170. If the file no longer exists, the remove-strategy can remove all managed objects 160 from the specified MBean servers 152. The remove-strategy can stop polling after detecting the deleted file and removing all managed objects 160. Table 3 shows an example of elements that can be included in a configuration file 172 for discovery objects 170:

Discovery objects 170 can use different strategies to examine the remote managed environment 500 and populate MBean servers 152 with MBeans that monitor resources 105 in remote managed environment 500. In some embodiments, an auto-discovery section can be included in configuration file 172 that can be used to auto-integrate MBeans discovered in remote managed environments 500.

Referring again to FIG. 1, in order to publish managed objects 160 as Web services, agent controller 140 must know the publisher that will be used. The following example in Table 5 pertains to an Apache/Axis web service platform. Other suitable elements can be included in configuration file 172 for other publishers in addition to, or instead of, the elements shown for the Axis platform.

TABLE 4

Web Service Publisher Configuration File Elements and Definitions

| Elements | Definition |
| --- | --- |
| Host | Name of processor where the Web service is running. |
| Port | The port number on the processor that is used by the web service engine to listen for publish requests. |
| ContextName | The Web application context name used by the Web services. This context name can be part of the base URL that is used to access the Web services. |
| Axis | Indicates that the web service engine implementation is Apache Axis |

The WSDL Generator configuration section defines configuration settings used by WSDL Generator 158 to generate WSDL documents for published managed objects 160. The WSDL documents can be stored as interface descriptions 162, which are discoverable by management applications 102. An example of a configuration section for WSDL generator 158 is shown in Table 5.

TABLE 5

WSDL Generator Configuration File Elements and Definitions

| Elements | Definition |
| --- | --- |
| SchemaLocation | File location where the WSDL XML Schemas will be stored. |
| SchemaBaseUrl | The base URL where all WSDL XML schemas can be retrieved. |
| WsdlLocation | File location where the WSDL documents will be stored. If the WSDL file cache is enabled (see IsFileCacheEnabled element), this is the |

TABLE 5-continued

WSDL Generator Configuration File Elements and Definitions

| Elements | Definition |
| --- | --- |
| WsdlBaseUrl | location that the file cache will use. The base URL where all WSDL documents can be retrieved. |
| WsdlCache | Optional settings to configure the WSDL cache. If not specified, default values can be supplied. |
| MemoryCacheMaxSize | The maximum size of the WSDL cache. |
| IsFileCacheEnabled | If true, all generated WSDL documents can be written to the file system in addition to being stored in the in-memory LRU cache. |
| ClearFileCacheOnRestart | If file caching is enabled, and this setting is true, then the WSDL generator can clear the entire file cache of previously generated WSDL documents every time the agent controller 140 is restarted. |
| NamespaceWsdlMap | Contains the mapping of target namespaces to their known WSDL locations. |
| NamespaceWsdlMapEntry | A single map entry that maps a target namespace URL to a known WSDL URL location. |

Referring to FIG. 1, client processor 104, processing platform 110, and discovery agencies 166 can be implemented in computer processing devices that include memory for storing and executing logic instructions, and are configured to interface with each other and with network 108. Various input/output devices, such as keyboard and mouse (not shown), can be included to allow a user to interact with components internal and external to system 100.

Additionally, client processor 104, processing platform 110, and discovery agencies 166 can be implemented in any suitable computing device, and so include personal data assistants (PDAs), telephones with display areas, network appliances, desktops, laptops, X-window terminals, or other such computing devices.

Logic instructions for components in system 100 can be stored on a computer readable medium, or accessed in the form of electronic signals. Components in system 100 can be configured to interface with each other, and to connect to external network 108 via suitable communication links such as any one or combination of T1, ISDN, cable line, a wireless connection through a cellular or satellite network, or a local data transport system such as Ethernet or token ring over a local area network.

The Hypertext Transfer Protocol/Secure (HTTPS) can be used when integrity and/or confidentiality of the SOAP messages is required. When end-to-end security of the SOAP payload is required, WS-Security or other communication protocols may be used. Client processor 104 can also authenticate itself to managed objects 160 and vice-versa. Mutual authentication features of HTTPS or other suitable authentication methods can be used.

The types, operations, and attributes disclosed herein are examples of features that can be included in the WSMF management interfaces, ModelMBeanInfo interface descriptors, and configuration file 172 for agent controller 140. Other features can be implemented for WSMF management interfaces, ModelMBeanInfo interface descriptors, and configuration file 172 for agent controller 140 in addition to, or instead of, the examples of features disclosed herein. Further, the names for the descriptors, interfaces, attributes, events, operations and other interface and configuration file features disclosed herein are provided for purposes of illustration only. The same names can be used to represent different features, and other names can be implemented to represent features disclosed herein.

The logic modules, processing systems, and circuitry described herein may be implemented using any suitable combination of hardware, software, and/or firmware, such as Field Programmable Gate Arrays (FPGAs), Application Specific Integrated Circuit (ASICs), or other suitable devices. The logic modules can be independently implemented or included in one of the other system components. Similarly, other components have been discussed as separate and discrete components. These components may, however, be combined to form larger or different software modules, logic modules, integrated circuits, or electrical assemblies, if desired.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. In the claims, unless otherwise indicated the article "a" is to refer to "one or more than one".

We claim:

1. A system for managing diverse information technology (IT) resources, comprising: an agent controller on a non-transitory computer readable storage medium executable on a computer processor, wherein the agent controller includes an MBean server configured with at least one MBean, further wherein the at least one MBean correlates to a managed object that represents a Web service, and the Web service includes features for managing at least one of the IT resources, wherein the agent controller is operable to: map the Web service to the at least one MBean; configure the managed, object with a management interface; and expose the management interface as the Web service; and a handler on computer readable storage medium executable on a computer processor and configured to communicate with a management application and the agent controller, wherein the handler is operable to: receive a request message for a management feature for managed objects independent of a resource and exposed as the Web service from the management application; and transmit a response message to the management application after a response to the request is fulfilled; translate the request message to a Web Services Description Language document to determine the Web service being requested by the management application; and determine, in response to the request message, whether the Web service being requested is available by correlating the Web service name to information in a descriptor of at least one MBean in the MBean server, wherein the information in the descriptor is based on the management interface for the managed object.

2. The system of claim 1, wherein the information in the descriptor includes a parameter indicating whether the Web service should be published for access by the management application.

3. The system of claim 1, further comprising a handler, wherein the requests pertain to at least one of the group of: setting an attribute of the managed object, getting an attribute of the managed object, and invoking an operation included in the managed object.

4. The system of claim 1, wherein the descriptor includes an indicator of whether the at least one MBean is compliant with Web Services Management Framework (WSMF) management interfaces.

5. The system of claim 1, wherein the descriptor includes a map of port type names to Web service resource properties.

6. The system of claim 1, wherein the descriptor includes a parameter that indicates the level of visibility of the at least one MBean.

7. The system of claim 1, wherein the descriptor includes information regarding the identity of the managed object, and operations and attributes that are available in the managed object.

8. The system of claim 1, wherein the descriptor includes information regarding the namespace for a Web Service Description Language (WSDL) document that defines the management interface.

9. The system of claim 1, wherein the descriptor includes information regarding whether the at least one MBean is to be placed in persistent storage.

10. The system of claim 1, wherein the descriptor includes information regarding the role of an operation including at least one of an attribute getter, an attribute setter, and an operation invoker.

11. The system of claim 1, wherein the descriptor includes information regarding the management interface category corresponding to a port type.

12. The system of claim 1, wherein the descriptor includes information regarding a notification that can be issued by the Web service to the management application.

13. The system of claim 1, wherein the handler communicates with the management application via a communication network.

14. The system of claim 1, further comprising a configuration file that specifies a Web service directory for Web services registered in the MBean server.

15. The system of claim 1, further comprising a configuration file that specifies a notification manager that handles notifications and subscriptions for MBeans registered in the MBean server.

16. The system of claim 1, further comprising a configuration file that specifies a relationship service, wherein the relationship service allows the managed object to maintain a list of relationships with other managed objects.

17. The system of claim 1, further comprising a configuration file that specifies a collections service, wherein the collections service supports features in the management interface that aggregate responses from multiple managed objects.

18. The system of claim 1, further comprising a configuration file that specifies a discovery strategy to find managed objects in the system.

19. The system of claim 1, further comprising a configuration file that specifies the name of the MBean server in which the at least one MBean is to be registered.

20. The system of claim 1, further comprising a configuration file that specifies a list of discovery objects that should complete before a specified discovery object is executed.

21. The system of claim 1, further comprising a configuration file that specifies whether external discovery of MBeans is enabled.

22. The system of claim 1, further comprising a configuration file that specifies publication information for the Web service.

23. The system of claim 1, further comprising a configuration file that specifies the location where an interface description of the management interface is stored, wherein the interface description is accessible by the management application to determine the Web services that are available for the corresponding IT resource.

24. The system of claim 1, wherein the messages are transmitted to and from the handler using the Simple Object Access Protocol (SOAP).

25. The system of claim 1, wherein the handler is a JAX-RPC handler.

26. A method for managing IT resources comprising: defining management capabilities available for a particular IT resource via at least one management interface, wherein the at least one management interface includes namespaces where elements that define an operation are placed, and port types that specify attributes and operations available in a Web service to manage the IT resource; and mapping the port types to descriptors in a ModelMBean Info interface that are used with an MBean that corresponds to the Web service; where the method comprises: mapping the Web service to the at least one MBean; configuring the managed object with a management interface; and exposing the management interface as the Web service; receiving a request message for a management feature for managed objects independent of a resource and exposed as the Web service from the management application; and transmitting a response message to the management application after a response to the request is fulfilled; translating the request message to a Web Services Description Language document to determine the Web service being requested by the management application; and determining, in response to the request message, whether the Web service being requested is available by correlating the Web service name to information in a descriptor of at least one MBean in the MBean server, wherein the information in the descriptor is based on the management interface for the managed object.

27. The method of claim 26, further comprising discovering MBeans in remote processing environments and registering the discovered MBeans in a MBean server.

28. The method of claim 26, further comprising determining relationships between the managed object representing the Web service and other managed objects representing other Web services.

29. The method of claim 26, further comprising accessing a configuration file that includes information regarding publishing the MBean.

30. The method of claim 26, further comprising accessing a configuration file that includes information regarding emitting events.

31. An apparatus for managing IT resources, comprising: means for configuring a managed object with at least one management interface; means for mapping a Web service to at least one MBean; means for determining management capabilities available for a particular IT resource via the at least one management interface, wherein the at least one management interface includes namespaces where elements that define an operation are placed, and port types that specify attributes and operations available in a Web service to manage the IT resource; means for exposing the at least one management interface to a management application as the Web service; means for mapping the port types to descriptors in a ModelMBean Info interface that are used with an MBean that corresponds to the Web service; means for registering the MBean in an MBean server; and means for determining relationships between a managed object representing the Web service and other managed objects representing other Web services.

32. The apparatus as set forth in claim 31, further comprising:

means for generating an interface description based on the management interface, wherein a remote management application can access the interface description to determine management features available for a particular IT resource.

* * * * *

UNITED STATES PATENT AND TRADEMARK OFFICE
CERTIFICATE OF CORRECTION

| | | |
|---|---|---|
| PATENT NO. | : 7,870,188 B2 | Page 1 of 1 |
| APPLICATION NO. | : 10/903277 | |
| DATED | : January 11, 2011 | |
| INVENTOR(S) | : John J. Mazzitelli et al. | |

It is certified that error appears in the above-identified patent and that said Letters Patent is hereby corrected as shown below:

In column 16, lines 40-41 (Approx.), in Claim 1, delete "managed," and insert -- managed --, therefor.

Signed and Sealed this
Tenth Day of May, 2011

David J. Kappos
*Director of the United States Patent and Trademark Office*